March 11, 1952 — J. A. ROBERTS — 2,588,987
PIPE JOINT
Filed Aug. 21, 1947 — 2 SHEETS—SHEET 1
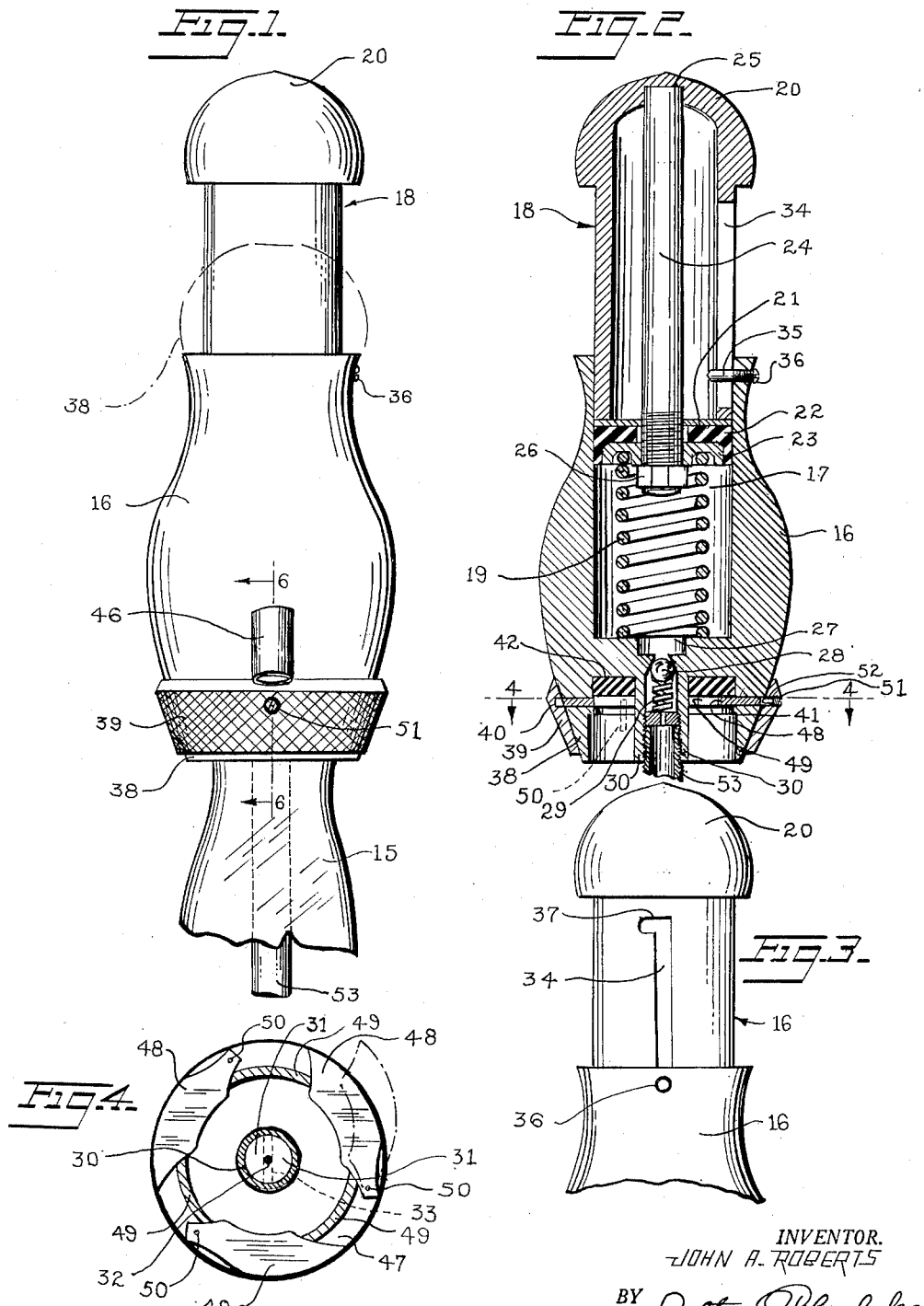
INVENTOR.
JOHN A. ROBERTS
BY [signature]
ATTORNEY March 11, 1952 — J. A. ROBERTS — 2,588,987
PIPE JOINT
Filed Aug. 21, 1947 — 2 SHEETS—SHEET 2
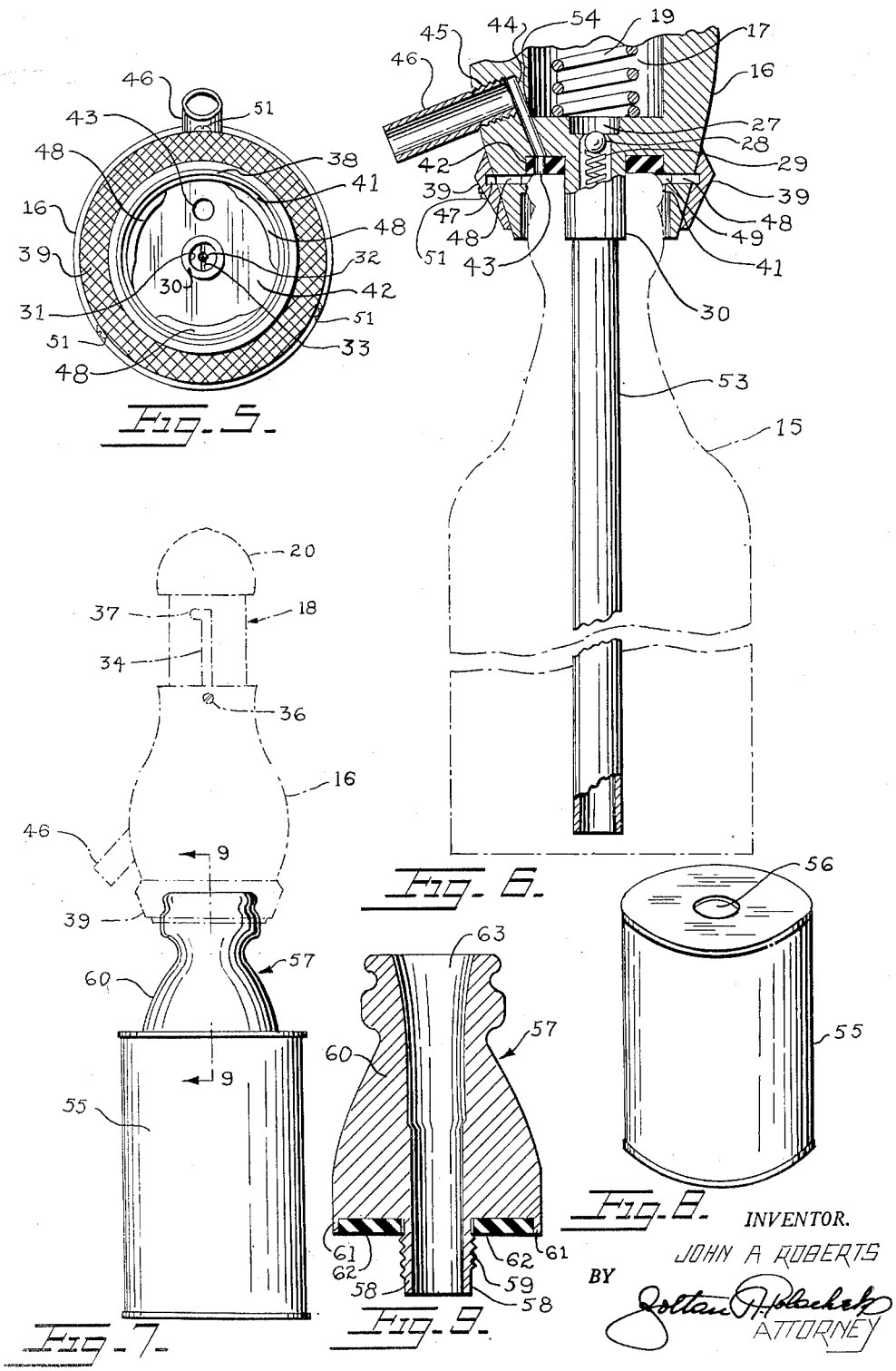
INVENTOR.
JOHN A ROBERTS Patented Mar. 11, 1952

2,588,987

UNITED STATES PATENT OFFICE 2,588,987

PIPE JOINT

John A. Roberts, New York, N. Y.

Application August 21, 1947, Serial No. 769,931

2 Claims. (Cl. 285—163)

The subject of this invention is an apparatus for giving a predispensing treatment to beer or the like in a dispensing container.

The aim of the invention is to provide an apparatus incorporating an attachment or appliance for ready connection to an individually opened bottle or can of beer or the like and for operation, then properly to invigorate the beer preparatory to pouring. Such invigoration allows beer for the first time to be poured from the dispensing container, yet then to have the same body and taste as is typical of draught beer.

According to the invention, the appliance as applied to a beer bottle includes a manually operable force pump above an open bottom cavity at the bottom of the appliance, said cavity affording a mouth for coaction with the open top of the bottle and having means for making a substantially air tight joint between said mouth and the bottle top. The pumped air is guided through a depending tube to near the bottom of the bottle and such air removes the over-effervescence freed to bubble and excessively foam the beer whenever poured in the ordinary way, that is, from the bottle immediately following opening of the latter. When the appliance of the present invention is preparatorily employed, however, the frothy bubbling is driven to the top of the bottle and thence into said appliance, for discharge therefrom, as by way of a suitably located spout.

A feature of the invention is that a plurality of interchangeable tubes of different lengths for the purpose just stated may be supplied, in combination with an arrangement on the appliance whereby one tube may be readily substituted for another, thereby to adapt the appliance for maximum efficiency in regard to beer bottles of different heights.

Also according to the invention, the appliance is adapted to be applied to the top of a beer can, and to that end the apparatus of the invention may include an auxiliary appliance for temporary addition to the top of a beer can to adapt the latter to be served by the appliance including the force pump.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view, partially broken away, of a force pump incorporating an embodiment of the invention as now favored, showing such appliance in working position atop a beer bottle.

Fig. 2 is a central longitudinal section, with certain parts shown in elevation, and one part, said tube, broken away below an upper length thereof.

Fig. 3 is a fragmentary elevation, looking toward the left in Fig. 1.

Fig. 4 is a horizontal section, taken on the line 4—4 of Fig. 2, but with the bottom ring omitted.

Fig. 5 is a bottom plan view, with said tube omitted.

Fig. 6 in full lines is a longitudinal section, this view taken on the line 6—6 of Fig. 1, showing in dot and dash a beer bottle having its open top engaged with the appliance as these parts are engaged for treating beer in the bottle.

Fig. 7 is an elevational view showing a beer can, with said auxiliary appliance applied thereto, and, in dot and dash, the force pump appliance atop said auxiliary appliance.

Fig. 8, showing a familiar can type of beer container in perspective, illustrates the substantially round hole to be pierced in an end of a can preparatory to applying said auxiliary appliance.

Fig. 9 is a central longitudinal section through said auxiliary appliance, this view taken on the line 9—9 of Fig. 7, but showing merely said appliance.

The appliance for direct application to a beer bottle, such as indicated at 15, comprises a main casing 16 having a cylindrical air compression chamber 17, and a plunger 18 reciprocable in said chamber, against an expansile spring 19.

At its upper end said plunger is enlarged to present a head 20 to be palm-pressed to cause descent of the plunger, which latter is formed as a hollow cylindrical shell below the head 20. Below a disc 21 closing the lower end of said shell, the plunger carries a cup-gasket 22. Said gasket is held tightly against the disc 21 by a second disc 23 having at its center a tapped hole for taking an external thread on the lower end of a rod 24. The rod 24 is secured at its upper end in an under recess 25 in the head 20.

A lock nut 26 is applied to said rod below a central boss at the underside of the disc 23.

In tight engagement around said boss is the top convolution of the spring 19, and the lower end of said spring bears against the bottom wall of the chamber 17 which is formed with a downwardly projected recess 27.

Below said depression is a port leading to a valve seat above a ball valve member 28, against which seat said ball is normally held by a light spring 29 in a hollow neck 30 depending from the bottom center of the casing 16. Said neck is internally threaded, for spiral adjustment therein of a short screw-stud 31, to retain the spring 19 and impart the proper tension thereto. Said screw-stud is centrally apertured to provide an air-discharge port 32, and at its lower end is provided with a screw-driver slot or kerf, see Fig. 5, 33.

Upward stroke of the plunger 18 is limited by a slot 34 engaged by a cylindrical extension 35 from a screw 36 carried by the casing 16. Said slot at its upper end has a lateral extension 37; there thus being provided a bayonet-joint type of securement to hold the head 20 as shown in dot and dash at 38 in Fig. 1, for compactness of the force pump appliance when not in use.

Opposite the neck 30, the bottom of the casing 16 is surrounded by a skirt 38 having exteriorly a downward taper, and on the outside of such skirt is a ring 39 having an internal annular groove 40 (Fig. 2) near its top.

Within the skirt 38 is a cylindrical cavity annularly shouldered at 41, in which cavity above said shoulder is seated a soft rubber annular washer 42 (Figs. 2 and 5); said washer having an aperture 43 (Fig. 6) opposite a drilled or otherwise suitably formed upwardly outwardly inclined passage 44, the upper end of which connects with a tapped hole 45 within which is threadedly secured the upper end of a spout 46.

For locking the washer 42 in proper angular position to maintain its aperture 43 aligned with the passage 44, the following parts are provided.

Opposite the internal annular groove 40 of the ring 39, the skirt 38 is provided with an external annular groove 47 (Figs. 4 and 6); and inwardly of this groove the skirt has three like slots, spaced 120° apart, for receiving three swing-dogs 48; the portions of the skirt 38 above and below the groove 47, and in the plane of said slots, being joined by three connector wall portions 49.

Each swing-dog 48 near one end thereof is pivoted at 50. Thus said dogs may all be swung out, to positions corresponding to that shown in dot and dash in Fig. 4, for inserting and adjusting the washer 42 or for a replacement thereof while said washer (see Fig. 5) is clamped in properly adjusted position on returning the dogs to their full line positions of Fig. 4.

The ring 39 at points spaced 120° around the same carries three screws 51 each having at its inner end a pin extension 52 (Fig. 2) lying in the annular groove 40 within the ring 39. With said ring placed properly on the skirt 38, said screws may be turned to advance their said pin extensions against points on and along the lengths of the dogs 48 to force the latter to swing inward against the connector walls 49 as shown in Fig. 4, thus to have the dogs disposed relative to the washer 42 as shown in Fig. 5.

A plurality of tubes, all like the tube 53 but of different lengths, may be provided. Said tube 53, it will be noted, is externally threaded at one end to match the thread in the neck 30; and when the appliance is to be used, said tube is mounted in place in said neck by screwing the former up into the latter and into abutment with the screw-stud 31.

When a bottle 15 of beer or the like is to be treated according to the invention, a tube like the tube 53, but of the proper length appropriate to the height of the bottle is attached as just described to the force pump appliance; and, the sealing cap having been pried off the bottle, the appliance is applied to the now open bottle top by lowering the tube into the bottle and sleeving the skirt 48 around the top bead at the upper end of the bottle neck to place the upper surface of said bead against the washer 42.

From Fig. 6 it may appear that said upper bead surface may close the aperture 43 in said washer; but that is not the case actually, due to the familiar rounding away of said bead as it descends down into the neck of the bottle. It is as important that said aperture be not plugged by the bottle top, as it is important to have the passage 44 connect only with the spout 46.

With the force pump appliance on the bottle as above described, a suitable number of down strokes of the plunger 18 gives the beer or the like in the bottle 15 the pretreatment of the invention, with the result that when the beer is poured following removal of the appliance from the bottle, the body and taste of the beer is exactly like that characteristic of draught beer.

Each such stroke drives the air in the chamber 17 down to the ball 28 and unseats the latter; the air then passing down through the tube 53 and into the bottom of the bottle 15. Between downstrokes of the plunger, sufficient air enters the chamber 17 each time the plunger arrives at the top of an upstroke; the replenishing air for the chamber 17 coming from the open interior of the plunger and forcing its way even past the gasket 22 due to the vacuous pull in said chamber, which condition cannot be relieved at the ball 28, now sucked tightly against its overlying seat.

The air stream driven into the collection of beer in the bottle 15, at the bottom of such collection, drives from the beer its excess gaseous content and the frothy bubbling ordinarily resulting therefrom incidental to attempting to pour the beer from the bottle following opening of the bottle. This frothy bubbling together with the excess gas is forced up to the washer 42, and thence through the latter's aperture 43, and so up along the passage 44 for discharge as a bubbly mass from the spout 46. When thereafter the beer is poured from the bottle, it will, as above, have the body and taste of draught beer, and with precisely the desired amount of surface foam.

Referring now particularly to Figs. 7, 8 and 9, a familiar type of beer container constituting a can is indicated at 55. Said can at one of its ends is given a substantially circular piercing 56, as by use of any implement (not shown) having a pointed end backed by a fairly gently tapering conical follow portion. It is of no consequence that such piercing 56 when made is not perfectly circular, or that displaced can-end portions may be jaggedly projected around said piercing; as will be seen in a moment.

For attachment to the can end at the piercing 56, the auxiliary appliance, marked as a whole 57, has at its central bottom a depending neck 58 exteriorly carrying a thread 59 of the type illustrated, that is, a thread which is of considerable height and which is to be described as somewhat of a spiral cutting knife with sides converging along straight lines toward its crest and with such sides of a contiguous pair of turns of the thread converging at the thread root there to provide a land which will act to smooth the piercing 56 to a circularity tight about the upper end of the neck 58 when the latter is screwed all the way down into said piercing.

The main body 60 of the appliance 57, which carries said neck 58, has a bottom skirt 61 providing a cavity around the upper end of said neck, within which is seated a soft rubber annular washer 62. Longitudinally of the said body 60 there is a cylindrical passage 63, the lower portion of which goes through the neck 58. The lower enlarged end of the body 60 is knurled as shown, to facilitate forcing the neck 58 down into the can 56 for bringing the washer into sealing engagement with the can over the piercing 56, by spiral advance of the thread 59 through the piercing.

When such engagement of the washer 62 is effected, the force pump appliance of Figs. 1-6 is applied to the top of the auxiliary appliance 57, as indicated in Fig. 7; to which end the upper exterior of the appliance 57 is shaped exactly as is shaped the top of a beer bottle, as illustrated, so that the top bead of said appliance 57 coacts with the washer 42 in the lower part of the force pump appliance as does the top bead of a beer bottle as already described in connection with Figs. 1-6.

The tube corresponding to the tube 53 for the force pump appliance will of course be of the proper length to have the lower end of said tube reach to near the bottom of the beer in the can 55; in which connection it may be pointed out that the height of the auxiliary appliance 57 is such that it represents the difference in height between that of a beer bottle of a favorite size and that of a beer can of a favorite type.

With the parts arranged as in Fig. 7, and with the force pump appliance forced down for firm placement of the washer 42 thereof over the top bead of the appliance 57, operation of the plunger 18 as already described pretreats pursuant to the invention the beer in the can, by driving upwardly and into the appliance 57 and thence to the spout 46 for discharge from the latter the frothy bubbling and excess gas in the beer.

To pour the beer from the can after its pretreatment, it is necessary merely to lift off the force pump appliance; and, indeed, temporary retention of the auxiliary appliance 57 on the can will facilitate such pouring.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an article of the class described having a body formed at its bottom with a depending circular skirt wall for fitting over the top of a bottle and an outlet port opening eccentrically into the skirt wall and a washer within the skirt wall sealing the engagement of the body with the bottle and having an eccentric hole aligned with the outlet port, means on the body holding the washer non-rotatively in position within the skirt wall with its hole aligned with the outlet port, comprising a plurality of dogs, the body being formed with a groove, each of said dogs being pivotally mounted at one end within the groove, the body being formed with slots in continuation of said groove and opening into the skirt wall and through which said dogs can be pivoted into the interior of the skirt wall, and means for pivoting said dogs inward, said groove and slots being formed on a level with relation to said washer so that when said dogs are pivoted inward their top faces will bear frictionally against the bottom face of the washer.

2. In an article of the class described having a body formed at its bottom with a depending circular skirt wall for fitting over the top of a bottle and an outlet port opening eccentrically into the skirt wall and a washer within the skirt wall sealing the engagement of the body with the bottle and having an eccentric hole aligned with the outlet port, means on the body holding the washer non-rotatively in position within the skirt wall with its hole aligned with the outlet port, comprising a plurality of dogs, the body being formed with a groove, each of said dogs being pivotally mounted at one end within the groove, the body being formed with slots in continuation of said groove and opening into the skirt wall and through which said dogs can be pivoted into the interior of the skirt wall, and means for pivoting said dogs inward, said groove and slots being formed on a level with relation to said washer so that when said dogs are pivoted inward their top faces will bear frictionally against the bottom face of the washer, said pivoting means comprising a ring mounted about the body and over said groove, and a screw for each of said dogs threaded through said ring, said screws having their inner ends projected into said groove and engaged against the respective dog intermediate of its ends for pivoting the dogs inward as the screws are threaded inward.

JOHN A. ROBERTS.

REFERENCES CITED

The following references are of record in the file of this patent:

UNITED STATES PATENTS

| Number | Name | Date |
| --- | --- | --- |
| 418,956 | Morgan et al. | Jan. 7, 1890 |
| 1,396,494 | Wright | Nov. 8, 1921 |
| 1,995,215 | Mehlsen et al. | Mar. 19, 1935 |

FOREIGN PATENTS

| Number | Country | Date |
| --- | --- | --- |
| 25,459 | Great Britain | Nov. 21, 1903 |
| 80,987 | Sweden | July 17, 1934 |
| 656,518 | Germany | Feb. 10, 1938 |
| 657,402 | Germany | Mar. 3, 1938 |
| 841,733 | France | Feb. 13, 1939 |